(12) United States Patent
Li et al.

(10) Patent No.: US 10,306,476 B2
(45) Date of Patent: May 28, 2019

(54) CONTROLLED SPATIAL REUSE IN A WLAN

(71) Applicant: Apple Inc., Cupertino, CA (US)

(72) Inventors: Guoqing Li, Campbell, CA (US);
Christiaan A. Hartman, San Jose, CA (US); Jarkko Kneckt, Campbell, CA (US); Yong Liu, Campbell, CA (US);
Su Khiong Yong, Palo Alto, CA (US);
Joonsuk Kim, Saratoga, CA (US);
Oren Shani, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/498,358

(22) Filed: Apr. 26, 2017

(65) Prior Publication Data
US 2017/0311166 A1    Oct. 26, 2017

Related U.S. Application Data

(60) Provisional application No. 62/327,874, filed on Apr. 26, 2016.

(51) Int. Cl.
| | |
|---|---|
| *H04L 29/06* | (2006.01) |
| *H04L 5/14* | (2006.01) |
| *H04L 12/24* | (2006.01) |
| *H04W 16/02* | (2009.01) |
| *H04W 52/36* | (2009.01) |

(Continued)

(52) U.S. Cl.
CPC ......... *H04W 16/02* (2013.01); *H04W 52/367* (2013.01); *H04W 74/006* (2013.01); *H04L 49/201* (2013.01); *H04W 84/12* (2013.01); *H04W 88/08* (2013.01)

(58) Field of Classification Search
CPC ............................ H04W 16/02; H04W 74/006
See application file for complete search history.

(56) References Cited

U.S. PATENT DOCUMENTS

| 7,720,440 B2 * | 5/2010 | Zhu ..................... H04W 74/002 |
|---|---|---|
| | | 370/328 |
| 2007/0060064 A1 * | 3/2007 | Srikrishna ........... H04W 52/267 |
| | | 455/67.11 |

(Continued)

*Primary Examiner* — Brian S Roberts
*Assistant Examiner* — Abusayeed M Haque
(74) *Attorney, Agent, or Firm* — Dickinson Wright RLLP (57) ABSTRACT

An interface circuit in an electronic device may receive, from an access point associated with the electronic device, a frame with management information that enables the electronic device to use a spatial-reuse technique, where the electronic device, through the spatial-reuse technique, adjusts a transmit power and a channel-availability sensing threshold. Moreover, the management information may specify parameters for the spatial-reuse technique. Then, the electronic device may transmit, using the spatial-reuse technique, one or more frames to the access point based on the parameters. Furthermore, the electronic device may transmit, to the access point, feedback information that indicates communication performance during the communication between the electronic device and the access point. For example, the feedback information may include a retry rate and, more generally, communication-performance information. This feedback information may be used by the access point to modify the parameters.

20 Claims, 6 Drawing Sheets

(51) Int. Cl.
*H04W 74/00* (2009.01)
*H04W 84/12* (2009.01)
*H04W 88/08* (2009.01)
*H04L 12/931* (2013.01)

(56) References Cited

U.S. PATENT DOCUMENTS

| | | | |
|---|---|---|---|
| 2014/0098681 A1* | 4/2014 | Stager | H04W 24/02 370/252 |
| 2016/0227489 A1* | 8/2016 | Oteri | H04W 74/0808 |
| 2016/0262054 A1* | 9/2016 | Singh | H04W 74/0808 |
| 2016/0269971 A1* | 9/2016 | Kim | H04W 16/14 |
| 2016/0374092 A1* | 12/2016 | Gao | H04W 72/0486 |
| 2017/0142753 A1* | 5/2017 | Wang | H04W 74/0808 |
| 2018/0014328 A1* | 1/2018 | Subramani | H04W 74/0808 |

\* cited by examiner

┌─────────────────────────────┐
    │   RECEIVE, FROM A SECOND    │
    │      ELECTRONIC DEVICE, A   │─ 210
    │      MANAGEMENT FRAME       │
    └──────────────┬──────────────┘
                   ▼
    ┌─────────────────────────────┐
    │  TRANSMIT, TO THE SECOND    │
    │ ELECTRONIC DEVICE, ONE OR MORE │─ 212
    │ FRAMES USING A SPATIAL-REUSE │
    │         TECHNIQUE           │
    └──────────────┬──────────────┘
                   ▼
    ┌─────────────────────────────┐
    │    PERFORM ONE OR MORE      │─ 214
    │   ADDITIONAL OPERATIONS     │
    └─────────────────────────────┘
```

| INFORMATION-ELEMENT IDENTIFIER | SPATIAL-REUSE ENABLE/DISABLE | OBSS_PD MAXIMUM | OBSS_PD MINIMUM | Tx_PW MAXIMUM | Tx_PW MINIMUM |

CONTROLLED SPATIAL REUSE IN A WLAN

CROSS-REFERENCE TO RELATED APPLICATIONS

This application claims the benefit of U.S. Provisional Patent Application No. 62/327,874, entitled "CONTROLLED SPATIAL REUSE IN A WLAN" filed Apr. 26, 2016, the content of which is incorporated herein by reference in its entirety for all purposes.

FIELD

The described embodiments relate, generally, to wireless communications among electronic devices in a wireless local area network (WLAN), including electronic devices and techniques for providing controlled or managed spatial reuse.

BACKGROUND

Many electronic devices communicate with each other using wireless local area networks (WLANs), such as those based on a communication protocol that is compatible with an Institute of Electrical and Electronics Engineers (IEEE) 802.11 standard (which is sometimes referred to as 'Wi-Fi'). In Wi-Fi, different electronic devices that are associated with an access point (which are sometimes referred to as 'stations') contend for a shared channel or communication medium. When transmissions from another station are detected, a station may 'back off' or wait until the shared channel is deemed free before attempting to transmit a frame. In particular, when a received energy exceeds a clear channel assessment (CCA) threshold, the shared channel may be considered busy.

This distributed approach for accessing the shared channel can result in collisions between the transmissions from different stations, which may result in retries and, more generally, reduced communication performance. These challenges can be significant in very crowded environments, where multiple stations are contending for the shared channel. Consequently, in crowded environments, delays in accessing the shared channel may increase the latency and may reduce the data rate.

Recently, in the IEEE 802.11ax standard, it has been proposed that individual stations be allowed to adapt their transmit power control (TPC) and their overlapping basic service set (OBSS) CCA thresholds. In particular, it has been proposed that a station may raise its OBBS CCA threshold while reducing its transmit power. In principle, this capability may allow the station to be more aggressive in accessing the shared channel in the presence of received energy associated with transmissions from one or more other stations, while reducing its transmit power so that it reduces its interference with respect to the one or more other stations. Therefore, the proposed adaption may provide improved communication performance for stations, especially when operating in crowded environments.

In practice, however, this approach may pose additional challenges. For example, when a station lowers its transmit power, it increases the likelihood that it becomes a hidden node to another station in the WLAN. Additionally, if a station reduces its transmit power when it raises its CCA threshold, this may result in a reduced ability for other stations in the WLAN to hear the transmissions from station A. Consequently, another station may simultaneously transmit within the same WLAN or basic service set (BSS). These concurrent transmissions may result in a collision at an access point that is associated with both the station and the other station.

Therefore, paradoxically, the proposal to allow individual stations to adapt their TPC and their overlapping basic service set OBSS CCA thresholds may degrade the communication performance, and, thus, may frustrate users of the electronic devices and degrade the user experience.

SUMMARY

Some embodiments that relate to an electronic device that receives a frame from a second electronic device are described. In particular, during operation, an interface circuit in the electronic device may receive the frame from a second electronic device, such as an access point in a WLAN. The frame may include management information that enables the electronic device to use a spatial-reuse technique, where the electronic device, through the spatial-reuse technique, adjusts a transmit power and a channel-availability sensing threshold. In response, the electronic device may transmit, using the spatial-reuse technique, one or more frames with the second electronic device or a third electronic device. In some embodiments, the second electronic device may include an access point. Moreover, the third electronic device may include another electronic device in a peer-to-peer network.

The management information of the frame may be communicated in: a unicast frame, and/or a broadcast frame. Furthermore, the management information may be intended solely for the electronic device. Alternatively or additionally, the management information may be intended for multiple electronic devices, including the electronic device, in the WLAN.

The management information may specify parameters for the spatial-reuse technique. For example, the interface circuit may operate in a range of transmit powers and channel-availability sensing thresholds specified by the parameters. Alternatively, the parameters may specify an operating point having: a fixed transmit power, and/or a fixed channel-availability sensing threshold. The parameters may be associated with transmit power control (TPC) threshold and/or with a clear-channel assessment (CCA) threshold.

In some embodiments, the interface circuit may provide or transmit, to the second electronic device, feedback information that indicates communication performance during the communication between the electronic device and the second electronic device.

Other embodiments include operation with and/or by the second electronic device or the third electronic device.

Other embodiments describe an interface circuit in the electronic device, the second electronic device, or the third electronic device.

Other embodiments describe a computer-program product for use with the interface circuit in the electronic device, the second electronic device, or the third electronic device. This computer-program product includes instructions for at least some of the aforementioned operations performed by the interface circuit in the electronic device, the second electronic device or the third electronic device.

Other embodiments describe a method for facilitating spatial reuse. The method includes at least some of the aforementioned operations performed by the interface circuit in the electronic device, the second electronic device, or the third electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

An electronic device that receives a frame from a second electronic device (such as an access point in a WLAN) is described. During operation, an interface circuit in the electronic device may receive, from the second electronic device associated with the electronic device, a frame that includes management information, which enables the electronic device to use a spatial-reuse technique, where the electronic device, through the spatial-reuse technique, adjusts a transmit power and a channel-availability sensing threshold. The management information may specify parameters for the spatial-reuse technique, and the electronic device may transmit, using the spatial-reuse technique, one or more frames with the second electronic device or with a third electronic device (such as another electronic device in a peer-to-peer network) based on the parameters. Furthermore, the electronic device may transmit, to the second electronic device, feedback information that indicates communication performance during communication between the electronic device and the second electronic device. For example, the feedback information may include a retry rate or, more generally, communication-performance information. This feedback information may be used by the second electronic device to modify the parameters, which then can be communicated to the electronic device.

By allowing the second electronic device to manage or control the spatial-reuse technique performed by the electronic device, this communication technique may reduce contention for the shared channel without increasing collisions. Stated differently, the communication technique may increase the communication performance, especially in crowded environments with multiple electronic devices contending for the shared communication channel. For example, by controlling when and how the electronic device adjusts its transmit power and clear channel assessment threshold, the communication technique may reduce or eliminate inadvertent hidden nodes and, thus, reduce or eliminate collisions during simultaneous transmissions in a WLAN. Moreover, by improving the communication performance, the communication technique may improve the user experience when using the electronic device, the second electronic device or the third electronic device, and thus may increase customer satisfaction and retention.

Note that the communication technique may be used during wireless communication between electronic devices in accordance with a communication protocol, such as: an IEEE 802.11 standard (which is sometimes referred to as Wi-Fi). For example, the communication technique may be used with IEEE 802.11ax, which is used as an illustrative example in the discussion that follows. However, this communication technique may also be used with a wide variety of other communication protocols, and in electronic devices (such as electronic devices and, in particular, mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-

2007; IEEE 802.11n; IEEE 802.11-2012; IEEE 802.11ac; IEEE 802.11ax, or other present or future developed IEEE 802.11 technologies.

In some embodiments, the second electronic device can act as a communications hub that provides access to a WLAN and/or to a WWAN and, thus, to a wide variety of services that can be supported by various applications executing on the second electronic device. Thus, the second electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

Figure 1:
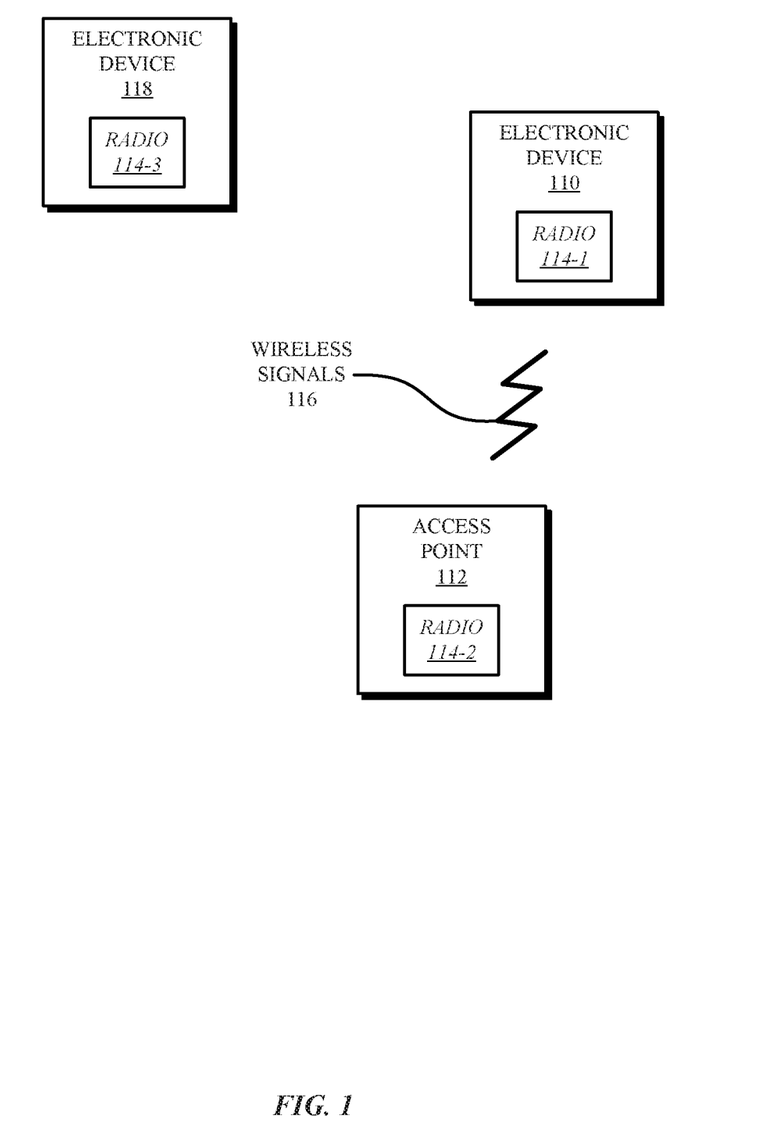
FIG. 1 is a block diagram illustrating an example of electronic devices communicating wirelessly.

FIG. 1 presents a block diagram illustrating an example of electronic devices communicating wirelessly. In particular, electronic device 110 (such as a smartphone, a laptop computer, a notebook computer, a tablet, a wearable computing device, or another such electronic device) and access point 112 may communicate wirelessly in a wireless local area network (WLAN) using an IEEE 802.11 communication protocol. Thus, electronic device 110 may be associated with access point 112. For example, electronic device 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Access point 112 may provide access to a network, such as the Internet, via an Ethernet protocol, and may be a physical access point or a virtual access point that is implemented on a computer. In some embodiments, electronic devices 110 and 118 communicate wirelessly, e.g., in a peer-to-peer network.

As described further below with reference to FIG. 6, electronic device 110, access point 112 and electronic device 118 may include subsystems, such as a networking subsystem, a memory subsystem, and a processor subsystem. In addition, electronic device 110, access point 112 and electronic device 118 may include radios 114 in the networking subsystems. More generally, electronic device 110, access point 112 and electronic device 118 can include (or can be included within) any electronic devices with networking subsystems that enable electronic device 110, access point 112 and electronic device 118 to wirelessly communicate with another electronic device. This can include transmitting beacons on wireless channels to enable electronic devices to make initial contact with or to detect each other, followed by exchanging subsequent data/management frames (such as connect requests) to establish a connection, configuring security options (e.g., IPSec), transmitting and receiving packets or frames via the connection, etc.

As can be seen in FIG. 1, wireless signals 116 (represented by a jagged line) are communicated by radios 114-1 and 114-2 in electronic device 110 and access point 112, respectively. For example, as noted previously, electronic device 110 and access point 112 may exchange packets using a Wi-Fi protocol in a WLAN. However, in a crowded environment (such as an environment in which multiple electronic devices are competing or contending for a shared channel), there may be delays in transmitting frames when electronic device 110 detects or receives energy in a frequency band or a communication channel. In particular, electronic device 110 may conclude that another electronic device (such as electronic device 118) may be transmitting, and electronic device 110 may wait for the frequency band or the communication channel to be clear of contention from other electronic devices. These delays may increase latency, may reduce the data rate or, more generally, may degrade the communication performance.

As noted previously, in principle, spatial reuse may allow electronic device 110 to address these challenges and, in the process, to improve the communication performance. For example, during spatial reuse, electronic device 110 may reduce its transmit power and may increase its channel-availability sensing threshold. In some circumstances, the former reduced transmit power may decrease a likelihood that transmissions from electronic device 110 interfere with those of another electronic device, and the latter increased channel-availability sensing threshold may allow electronic device 110 to access the shared channel so long as the received energy remains below the increased channel-availability sensing threshold. Thus, the spatial-reuse technique may allow electronic device 110 to transmit when it otherwise might not be able to.

However, as noted previously, in some circumstances spatial reuse can degrade communication performance. For example, when electronic device 110 decreases its transmit power, another electronic device (such as electronic device 118) may no longer be able to detect transmissions from electronic device 110. This may make electronic device 110 a de facto hidden node in the WLAN. Subsequently, electronic device 118 may decide to transmit concurrently with transmissions from electronic device 110. Even though these overlapping transmissions may not be received, respectively, by electronic devices 110 and 118, the transmissions may interfere with each other at access point 112. Consequently, spatial reuse may inadvertently result in collisions and, thus, in dropped or missed frames at access point 112, and may necessitate one or more retries by electronic devices 110 and/or 118.

In order to address this challenge, access point 112 may control or manage the use of spatial reuse in the WLAN. This approach may leverage 'situational awareness' that access point 112 has about other electronic devices in the WLAN. Notably, access point 112 may leverage its situational awareness to avoid inadvertent hidden nodes and/or to specify operating parameters for a spatial-reuse technique that help increase the likelihood that communication performance of electronic device 110 is improved in a wide variety of wireless environments.

In particular, access point 112 may transmit a frame that includes management information to electronic device 110. This management information may provide an indication to enable (or disable) use of a spatial-reuse technique by electronic device 110, where the spatial-reuse technique allows electronic device 110 to adjust a transmit power and a channel-availability sensing threshold. (Alternatively, in some embodiments the management information includes an instruction or a command to enable or disable use of the spatial-reuse technique.) In response, electronic device 110 may transmit one or more frames to access point 112 (or another electronic device in the WLAN, another electronic device in a peer-to-peer network, etc.) using the spatial-reuse technique when enabled to do so. Electronic device 110 may also discontinue use of the spatial-reuse technique in response to an indication to disable use thereof.

Moreover, access point 112 may transmit the management information to electronic device 110 using a unicast frame (i.e., the management information may be intended solely for electronic device 110). Alternatively or additionally, access point 112 may transmit the management information to electronic device 110 using a broadcast frame. In such embodiments, the management information may be intended for multiple electronic devices (e.g., electronic devices 110 and 118), in the WLAN. In general, the management information included in a broadcast frame may be intended for a subset of electronic devices in the WLAN, in some embodiments, or for all of the electronic devices in the WLAN, in some embodiments.

The management information may specify parameters for the spatial-reuse technique. For example, an interface circuit in electronic device 110 may operate in a range of transmit powers and channel-availability sensing thresholds specified by the parameters. Alternatively, the parameters may specify an operating point having: a fixed transmit power, and/or a fixed channel-availability sensing threshold. Thus, the management information may indicate how tightly access point 112 controls or manages the spatial-reuse technique used by electronic devices in the WLAN, such as electronic device 110. Note that the parameters may be associated with transmit power control (TPC) threshold and/or with a clear-channel assessment (CCA) threshold.

Additionally, electronic device 110 may transmit, to access point 112, feedback information that indicates communication performance during the communication between electronic device 110 and access point 112. For example, electronic device 110 may transmit information that specifies a retry rate of electronic device 110. More generally, the feedback information may include one or more communication performance metrics determined and/or measured by electronic device 110. Alternatively or additionally, access point 112 may determine and/or measure additional feedback information. In particular, access point 112 may determine a received signal strength (RSS), and this RSS may be used to estimate a distance between access point 112 and, e.g., electronic device 110. Using the feedback information and/or the additional feedback information, access point 112 may update or modify the management information, provided to one or more electronic devices, e.g., electronic device 110, including whether the spatial-reuse technique is enabled/disabled and/or the parameters for the spatial-reuse technique. Consequently, in some embodiments, the spatial-reuse technique is managed or controlled using a dynamic closed-loop process between the access point 112 and one or more electronic devices, e.g., electronic device 110.

In other embodiments of the communication technique, access point 112 transmits the management information to electronic device 110, and then electronic device 110 may transmit the one or more frames to electronic device 118 (or another electronic device in the WLAN, another electronic device in a peer-to-peer network, etc.) using the spatial-reuse technique when enabled to do so. Furthermore, while electronic device 110 may transmit the feedback information to access point 112, in some embodiments electronic device 118 transmits the feedback information to access point 112. The feedback information from electronic device 118 may be instead of or in addition to the feedback information from electronic device 110.

In these ways, the communication technique may allow electronic device 110 to use spatial reuse in a controlled or managed way. Consequently, the communication technique may facilitate spatial reuse and, thus, improved communication performance when communicating with access point 112. These capabilities may improve the user experience when using electronic device 110 and/or access point 112.

In the described embodiments, processing a packet or frame in one of electronic device 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data included in a payload of the packet or frame).

In general, communication via the WLAN, when using the communication technique, may be characterized by a variety of communication-performance metrics. For example, the communication-performance metric may include any or all of: an RSS, a data rate, a data rate for successful communication (which may also be referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as 1-10 s) to an estimated maximum number of bytes that can be communicated in the time interval (the latter of which is sometimes referred to as a 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more, fewer and/or different electronic devices. As another example, in other embodiments, different electronic devices can be transmitting and/or receiving packets or frames.

Figure 2:
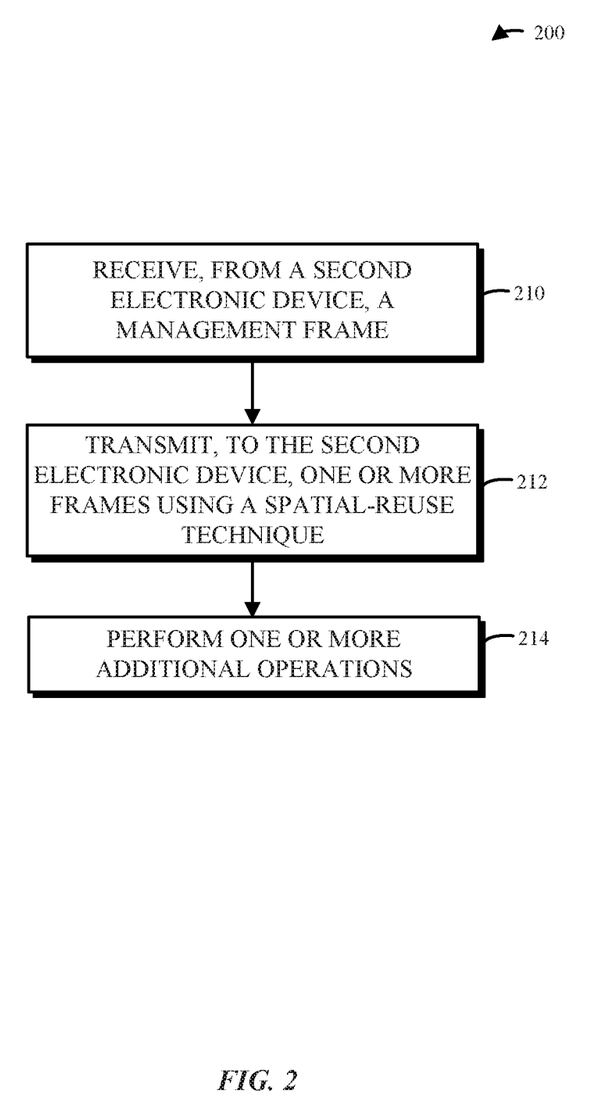
FIG. 2 is a flow diagram illustrating an example of a method for transmitting one or more frames using one of the electronic devices in FIG. 1.

FIG. 2 presents a flow diagram illustrating an example method 200 for transmitting one or more frames in accordance with some embodiments. This method may be performed by an electronic device, such as an interface circuit in electronic device 110 in FIG. 1. During operation, the electronic device may receive, from a second electronic device (such as an access point), management information (operation 210) that enables use of a spatial-reuse technique by the electronic device, where the electronic device, through the spatial-reuse technique, adjusts a transmit power and a channel-availability sensing threshold. Moreover, the management information may specify parameters for the spatial-reuse technique. For example, the management information may include or may specify minimum and maximum transmit powers (or an allowed range of transmit powers)

and/or minimum and maximum channel-availability sensing thresholds (or an allowed range of channel-availability sensing thresholds).

The electronic device may transmit one or more frames with the second electronic device using the spatial-reuse technique (operation 212), e.g., in accordance with the management information received from the second electronic device.

In some embodiments, the electronic device optionally performs one or more additional operations (operation 214). For example, the electronic device may transmit feedback information that indicates communication performance during the communication between the electronic device and the second electronic device.

In some embodiments, after receiving the management information from the second electronic device (operation 210), electronic device 110 transmits the one or more frames with a third electronic device (such as another electronic device in the WLAN, another electronic device in a peer-to-peer network, etc.) using the spatial-reuse technique. Furthermore, while electronic device 110 may optionally transmit the feedback information to the second electronic device, in some embodiments the third electronic device transmits the feedback information to the second electronic device.

Figure 3:
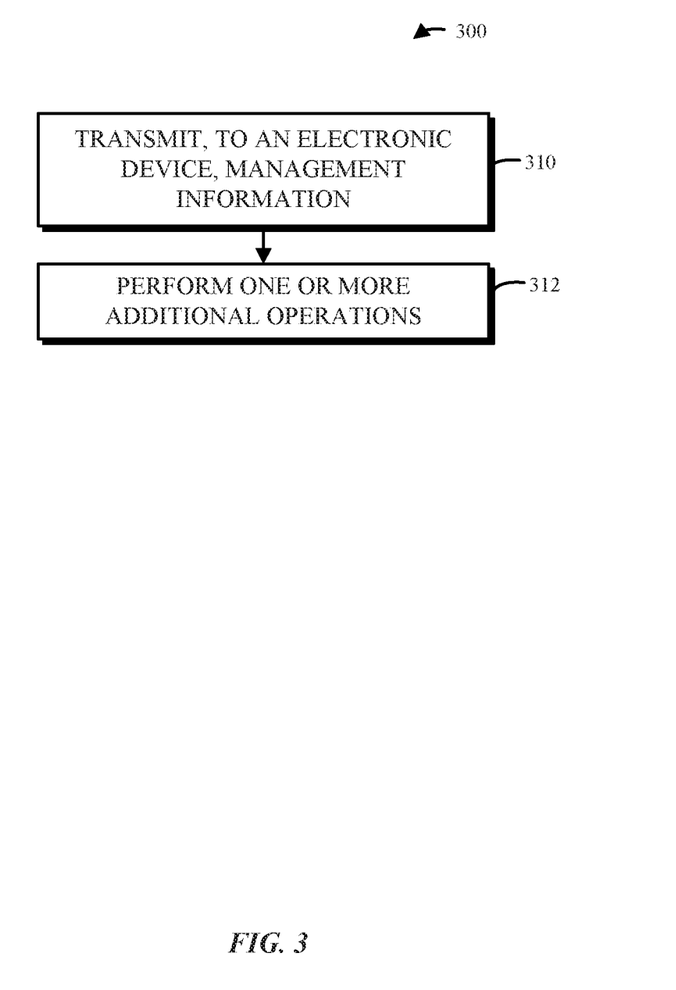
FIG. 3 is a flow diagram illustrating an example of a method for transmitting management information using one of the electronic devices in FIG. 1.

FIG. 3 presents a flow diagram illustrating an example method 300 for transmitting management information in accordance with some embodiments. This method may be performed by an electronic device, e.g., a second electronic device, such as an interface circuit in access point 112 in FIG. 1. During operation, the second electronic device transmits, to an electronic device, management information (operation 310) that enables use of a spatial-reuse technique by the electronic device, where the electronic device, through the spatial-reuse technique, is allowed to adjust a transmit power and/or a channel-availability sensing threshold. Moreover, the management information may specify parameters for the spatial-reuse technique.

In some embodiments, the second electronic device optionally performs one or more additional operations (operation 312). For example, the second electronic device may receive, from the electronic device, feedback information that indicates communication performance during the communication between the electronic device and the second electronic device, such as one or more communication-performance metrics. Alternatively or additionally, the second electronic device may receive the feedback information from a third electronic device, such as another electronic device in the WLAN, another electronic device in a peer-to-peer network, etc. In addition, the second electronic device may determine additional feedback information, e.g., based on communication with the electronic device. The second electronic device may modify the parameters based on the feedback information and/or the additional feedback information. Furthermore, the second electronic device may transmit, to the electronic device, the modified parameters.

In some embodiments of method 200 (FIG. 2) and/or of method 300 (FIG. 3), there may be additional, different and/or fewer operations. Moreover, the order of the operations may be changed, and/or two or more operations may be combined into a single operation.

In some embodiments, at least some of the operations in method 200 (FIG. 2) and/or in method 300 (FIG. 3) are performed by interface circuits in the electronic device or the second electronic device. For example, at least some of the operations may be performed by firmware executed by an interface circuit, such as by firmware associated with a MAC layer, as well as one or more circuits in a physical layer in the interface circuit.

Figure 4:
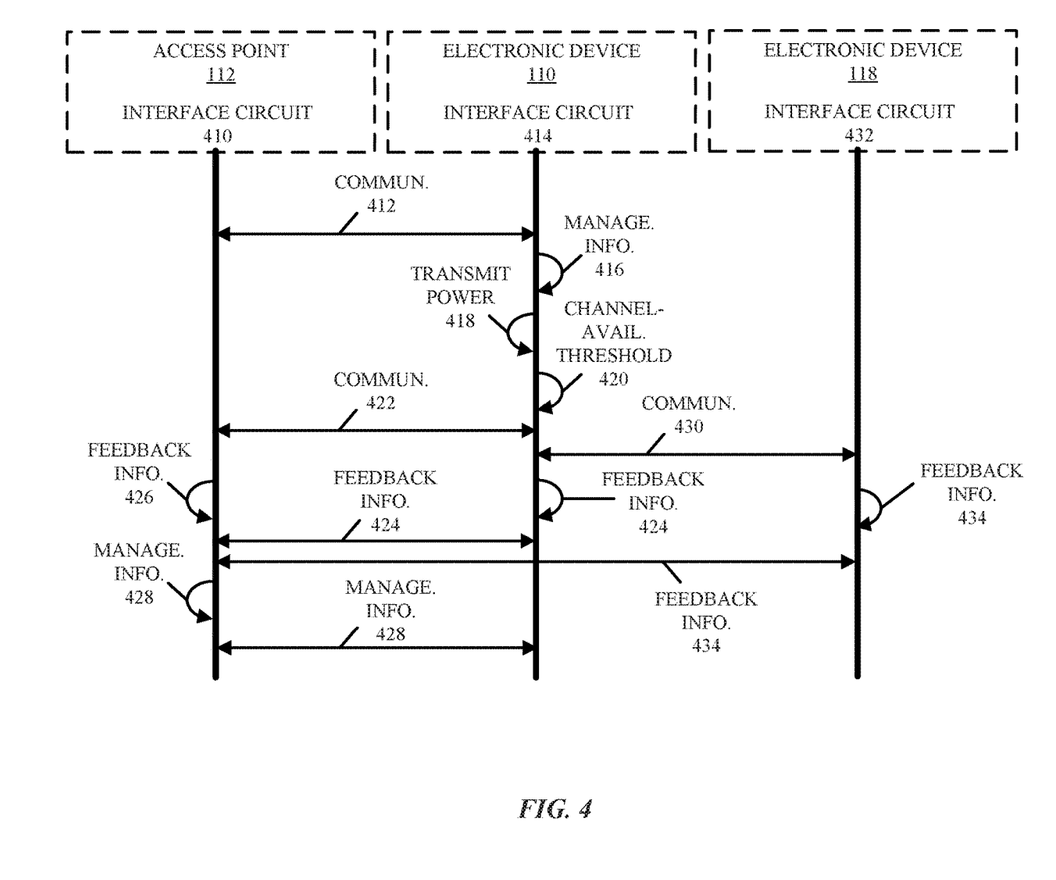
FIG. 4 is a flow diagram illustrating an example of communication between electronic devices, such as the electronic devices of FIG. 1.

FIG. 4 illustrates a flow diagram of an example of communication between electronic device 110, access point 112 and electronic device 118, in accordance with some embodiments. In particular, interface circuit 410 in access point 112 may communicate 412 with interface circuit 414 in electronic device 110 using Wi-Fi. During this communication, access point 112 may transmit management information 416 to electronic device 110. This management information may enable or disable use of a spatial-reuse technique by electronic device 110 and/or may specify parameters associated with a spatial-reuse technique.

After receiving management information 416, electronic device 110 may store management information 416 in memory. Moreover, if management information 416 enables use of the spatial-reuse technique, interface circuit 414 may subsequently adjust a transmit power 418 and/or a channel-availability sensing threshold 420 during communication 422 with access point 112 (or another electronic device in the WLAN, another electronic device in a peer-to-peer network, etc.). In addition, interface circuit 414 may optionally determine and transmit feedback information 424 that indicates communication performance during the communication 412. For example, feedback information 424 may include one or more communication-performance metrics.

Next, interface circuit 410 may optionally receive feedback information 424. In addition, interface circuit 410 may optionally determine additional feedback information 426, such one or more communication-performance metrics associated with communication 414. Based on feedback information 424 and/or 426, interface circuit 410 may optionally determine modified management information 428, and then may optionally transmit modified management information 428 to interface circuit 414. Note that modified management information 428 may disable or enable the spatial-reuse technique used by electronic device 110 and/or may modify the parameters.

While FIG. 4 illustrates communication between electronic device 110 and access point 112 as bidirectional, in some embodiments, some or all of these instances of communication may be unidirectional.

In some embodiments, after receiving management information 416, interface circuit 114 optionally communicates 430 one or more frames with interface circuit 432 in electronic device 118 using the spatial-reuse technique. Furthermore, interface circuit may optionally determine and transmit feedback information 434 to interface circuit 410, which may use feedback information 434 when optionally determining modified management information 428.

Representative Embodiments

We now describe exemplary embodiments of the communication technique. In the communication technique, a spatial-reuse technique is implemented in a managed network. For example, an access point (and, more generally, another electronic device) is used to: enable/disable the spatial-reuse technique; and/or configure the parameters used in the spatial-reuse technique.

For example, the access point may specify: a spatial-reuse indicator (which is an indication that enables or disables the use of the spatial-reuse technique at an electronic device in a WLAN), a value for an $OBSS\_PD_{max}$ (i.e., the maximum OBSS_PD that an electronic device can use), a value for an $OBSS\_PD_{min}$ (i.e., the minimum OBSS_PD that an electronic device can use), a value for a $Tx\_PWR_{max}$ (i.e., the maximum transmit power that an electronic device can use), and/or a value for a Tx_PWR$_{min}$ (i.e., the minimum transmit power that an electronic device can use). Note that these parameters may be used to dynamically adjust the transmit power and/or to select a dynamic CCA (which is sometimes represented as 'OBSS_PD') for use by an electronic device. In particular, using the parameters that electronic device may select the OBSS_PD according to $$OBSS\_PD = \max\left[\min\left[\begin{array}{c} OBSS\_PD_{min} \\ OBSS\_PD_{max} \\ OBSS\_PD_{min} + (Tx\_PWR_{ref} - Tx\_PWR) \end{array}\right]\right],$$

wherein Tx_PWR$_{ref}$ is an absolute reference power level, $$OBSS\_PD_{min} = OBSS\_PD_{min}(@20 \text{ MHz}) + 10 \cdot \log\left(\frac{BW}{20 \text{ MHz}}\right),$$

$$OBSS\_PD_{max} = OBSS\_PD_{max}(@20 \text{ MHz}) + 10 \cdot \log\left(\frac{BW}{20 \text{ MHz}}\right),$$

and BW is the bandwidth. This approach may preserve fairness for lower power electronic devices.

Note that Tx_PWR$_{ref}$ may be, e.g., 23 dBm (although this value is as a non-limiting illustration and other values may be used). Moreover, Tx_PWR may depend on a classification of an electronic device. For example, for class A, Tx_PWR may be the transmit power, while for class B Tx_PWR may be the transmit power plus an additional numerical value (in dB). In some embodiments, based on the parameters and on the Tx_PWR, OBSS_PD may decrease linearly from −62 dBm to −82 dBm at a Tx_PWR of 23 dBm. In other embodiments, OBSS_PD may decrease differently, linearly or non-linearly, and at a different Tx_PWR.

The access point may convey or communicate the spatial-reuse indicator and/or the parameters (which are sometimes referred to as a 'set of parameters' or 'management information') by transmitting: a broadcast frame with the indicator and/or some or all of the parameters to allow all electronic devices within the same WLAN to use the same set of parameters; and/or a unicast frame to a particular electronic device to set up some or all of the parameters used by this electronic device. Note that different electronic devices in a WLAN may use a different set of parameters. Moreover, the access point may configure a subset of the parameters used by an electronic device via a unicast frame and the remainder of the parameters used by the electronic device may be conveyed using a broadcast frame.

Figure 5:
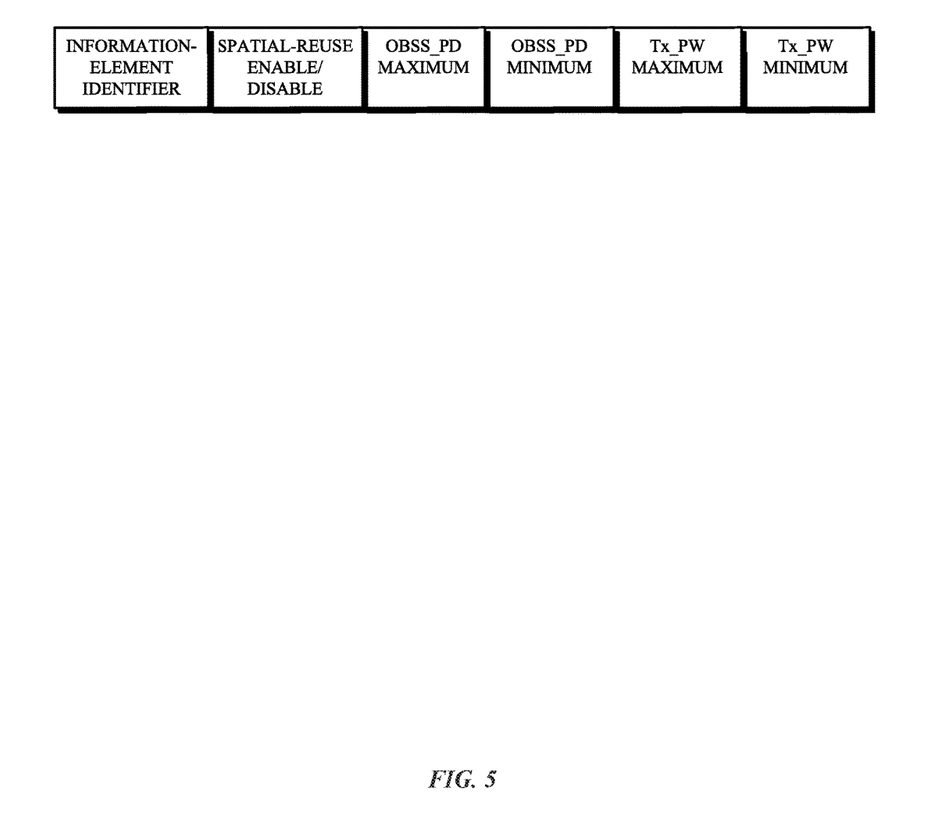
FIG. 5 is a block diagram illustrating an example of a frame that includes management information.

For broadcast communication, the set of parameters may be carried in a high-efficiency (HE) operation information element in IEEE 802.11ax. In particular, additional information may be included in this information element. Alternatively, a new information element (which is sometimes referred to as a 'spatial-reuse configuration') may be defined. This spatial-reuse configuration may be conveyed or carried in a beacon or another management frame. The spatial-reuse configuration is illustrated in FIG. 5, which presents a block diagram illustrating an example of a frame that includes management information in accordance with some embodiments.

Alternatively, for unicast communication, the management information may be communicated in management frames using a request/response technique. In particular, a spatial-reuse configuration request may be sent by the access point. Then, the electronic device may provide or transmit a spatial-reuse response. These two management frames may have the format of the spatial-reuse configuration or may have a different configuration to specify the set of parameters for individual electronic devices (or stations).

Note that it is possible that maximum and minimum values in the parameters can be set to the same value. In these embodiments, the electronic device may be operated at a fixed point (such as a fixed transmit power or a fixed CCA) instead of with a given range for free adaptation.

In summary, in the communication technique an access point may control spatial reuse in, e.g., IEEE 802.11ax. In particular, the access point may enable/disable the use of spatial reuse at an individual electronic device. In addition, the access point may configure the spatial-reuse adaptation parameters. Moreover, the access point may configure some or all of the parameters in a broadcast or a unicast manner. Furthermore, the access point may configure an electronic device to operate on a fixed point or to operate within a range specified in the parameters.

We now describe embodiments of an electronic device. FIG. 6 presents a block diagram of an electronic device 600 (which may be an access point or another electronic device, such as a station) in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), a read-only memory (ROM), flash memory, and/or other types of memory. In some embodiments, instructions for processing subsystem 610 in memory subsystem 612 include: one or more program modules or sets of instructions (such as program module 622 or operating system 624), which may be executed by processing subsystem 610. For example, a ROM can store programs, utilities or processes to be executed in a non-volatile manner, and DRAM can provide volatile data storage, and may store instructions related to the operation of electronic device 600. Note that the one or more computer programs may constitute a computer-program mechanism, a computer-readable storage medium or software. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610. In some embodiments, the one or more computer programs are distributed over a network-coupled computer system so that the one or more computer programs are stored and executed in a distributed manner.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Figure 6:
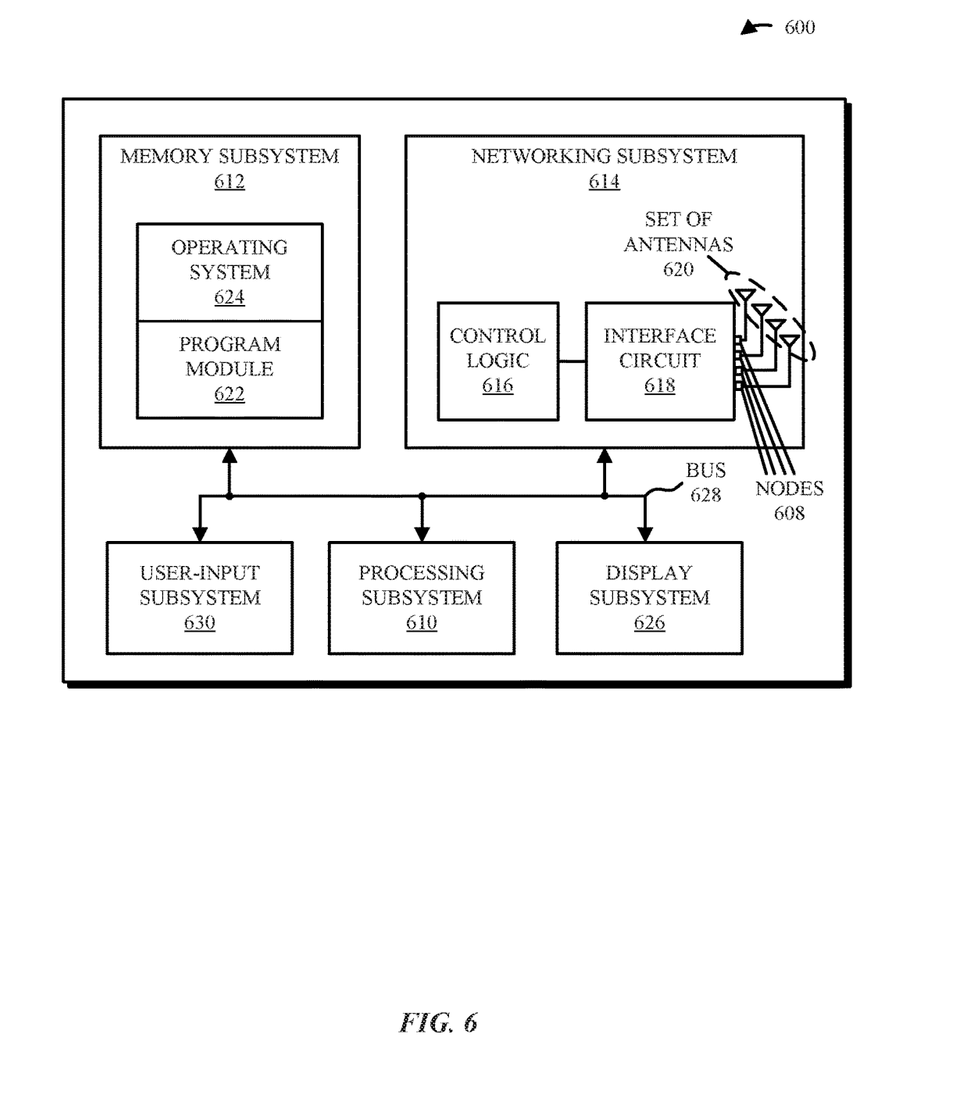
FIG. 6 is a block diagram illustrating an example of one of the electronic devices of FIG. 1.

Networking subsystem 614 includes one or more devices configured to couple to and communicate on a wired and/or wireless network (i.e., to perform network operations), including: control logic 616, an interface circuit 618 and a set of antennas 620 (or antenna elements) in an adaptive array that can be selectively turned on and/or off by control logic 616 to create a variety of optional antenna patterns or 'beam patterns.' (While FIG. 6 includes set of antennas 620, in some embodiments electronic device 600 includes one or more nodes, such as nodes 608, e.g., a pad, which can be coupled to set of antennas 620. Thus, electronic device 600 may or may not include set of antennas 620.) For example, networking subsystem 614 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices.

Within electronic device 600, processing subsystem 610, memory subsystem 612, and networking subsystem 614 are coupled together using bus 628 that facilitates data transfer between these components. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc. Display subsystem 626 may be controlled by processing subsystem 610 to display information to a user (e.g., information relating to incoming, outgoing, or an active communication session).

Electronic device 600 can also include a user-input subsystem 630 that allows a user of the electronic device 600 to interact with electronic device 600. For example, user-input subsystem 630 can take a variety of forms, such as: a button, keypad, dial, touch screen, audio input interface, visual/image capture input interface, input in the form of sensor data, etc.

Electronic device 600 can be (or can be included in) any electronic device with at least one network interface. For example, electronic device 600 may include: a cellular telephone or a smartphone, a wireless device, a mobile device, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program module 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614. This integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Alternatively or additionally, at least some of the operations in the communication technique may be implemented in a physical layer, such as hardware in interface circuit 618. In an exemplary embodiment, the communication technique is implemented, at least in part, in a MAC layer and/or in a physical layer in interface circuit 618.

While the preceding discussion illustrated the communication technique with management information provided by the second electronic device, which is then performed by the electronic device (such as enabling the spatial-reuse technique), in other embodiments the management information is a suggestion that may or may not be performed by the electronic device.

Representative Embodiments

In some embodiments, an electronic device includes: (i) one or more nodes configured to communicatively couple to an antenna, and (ii) an interface circuit communicatively coupled to the one or more nodes and configured to communicate with a second electronic device. The interface circuit is further configured to receive, from the second electronic device, management information that enables the electronic device to use a spatial-reuse technique, where the electronic device, through the spatial-reuse technique, adjusts a transmit power and a channel-availability sensing threshold; and transmit, using the spatial-reuse technique, one or more frames to the second electronic device or to a third electronic device.

In some embodiments, the second electronic device includes an access point. In some embodiments, the management information is received in one of: a unicast frame or a broadcast frame. In some embodiments, the management information is intended solely for the electronic device. In some embodiments, the management information is intended for multiple electronic devices, including the electronic device, in a wireless local area network (WLAN). In some embodiments, the management information specifies parameters for the spatial-reuse technique. In some embodiments, the interface circuit is further configured to operate in a range of transmit powers and channel-availability sensing thresholds specified by the parameters. In some embodiments, the parameters specify an operating point having at least one of: a fixed transmit power, or a fixed channel-availability sensing threshold. In some embodiments, the parameters are associated with a transmit power control (TPC) threshold and a clear-channel assessment (CCA) threshold. In some embodiments, the interface circuit is further configured to transmit, to the second electronic device, feedback information that indicates communication performance during communication between the electronic device and the second electronic device. In some embodiments, the electronic device further includes the antenna communicatively coupled to the one or more nodes.

In some embodiments, a non-transitory computer-readable storage medium stores instructions that, when executed by an interface circuit included in a mobile device, cause the mobile device to communicate one or more frames using a spatial-reuse technique, by carrying out operations that include: (i) receiving, from an access point, management information that enables the mobile device to use the spatial-reuse technique, where the mobile device, through the spatial-reuse technique, adjusts a transmit power and a channel-availability sensing threshold; and (ii) transmitting, using the spatial-reuse technique, one or more frames to the access point or to an electronic device in a peer-to-peer network.

In some embodiments, the mobile device receives the management information from the access point in a unicast frame or in a broadcast frame. In some embodiments, the management information specifies parameters for the spatial-reuse technique. In some embodiments, the interface circuit of the mobile device is configured to operate in a range of transmit powers and channel-availability sensing thresholds specified by the parameters. In some embodiments, the parameters specify an operating point having a fixed transmit power, a fixed channel-availability sensing threshold, or both the fixed transmit power and the fixed channel-availability sensing threshold. In some embodiments, the parameters are associated with a transmit power control (TPC) threshold and a clear-channel assessment (CCA) threshold. In some embodiments, the interface circuit of the mobile device is further configured to transmit to the access point feedback information that indicates communication performance for communication between the mobile device and the access point.

In some embodiments, a method for communicating one or more frames using a spatial-reuse technique includes using an interface circuit in an electronic device to: (i) receive, from an access point, management information that enables the electronic device to use the spatial-reuse technique and that specifies parameters for the spatial-reuse technique, where the electronic device, through the spatial-reuse technique, adjusts a transmit power and a channel-availability sensing threshold; and (ii) transmit, using the spatial-reuse technique, one or more frames to the access point or to another electronic device.

In some embodiments, the mobile device receives the management information from the access point in a unicast frame or in a broadcast frame. In some embodiments, the management information specifies parameters for the spatial-reuse technique. In some embodiments, the interface circuit of the mobile device is configured to operate in a range of transmit powers and channel-availability sensing thresholds specified by the parameters. In some embodiments, the parameters specify an operating point having a fixed transmit power, a fixed channel-availability sensing threshold, or both the fixed transmit power and the fixed channel-availability sensing threshold. In some embodiments, the parameters are associated with a transmit power control (TPC) threshold and a clear-channel assessment (CCA) threshold. In some embodiments, the interface circuit of the mobile device is further configured to transmit to the access point feedback information that indicates communication performance for communication between the mobile device and the access point.

In some embodiments, an electronic device includes: (i) one or more nodes configured to communicatively couple to an antenna; and (ii) an interface circuit, communicatively coupled to the one or more nodes, configured to communicate with a second electronic device, and configured to transmit, to the second electronic device, management information that enables the second electronic device to use a spatial-reuse technique, where the second electronic device, through the spatial-reuse technique, is allowed to adjust a transmit power and a channel-availability sensing threshold.

In some embodiments, the electronic device includes an access point. In some embodiments, the management information is transmitted in a unicast frame or in a broadcast frame. In some embodiments, the management information is intended solely for the second electronic device. In some embodiments, the management information is intended for multiple electronic devices, including the second electronic device, in a wireless local area network (WLAN). In some embodiments, the management information specifies parameters for the spatial-reuse technique. In some embodiments, the parameters specify a range of transmit powers and channel-availability sensing thresholds. In some embodiments, the parameters specify an operating point having at least one of: a fixed transmit power, or a fixed channel-availability sensing threshold. In some embodiments, the parameters are associated with transmit power control (TPC) threshold and a clear-channel assessment (CCA) threshold. In some embodiments, the interface circuit of the electronic device is further configured to: (i) receive, from the second electronic device or a third electronic device, feedback information that indicates communication performance for communication between the electronic device and the second electronic device or the third electronic device; (ii) modify the parameters based on the feedback information; and (iii) transmit, to the second electronic device, the modified parameters. In some embodiments, the electronic device further includes the antenna communicatively coupled to the one or more nodes.

In some embodiments, the electronic device includes an access point. In some embodiments, the management information is transmitted in a unicast frame or in a broadcast frame. In some embodiments, the management information is intended solely for the second electronic device. In some embodiments, the management information is intended for multiple electronic devices, including the second electronic device, in a wireless local area network (WLAN). In some embodiments, the management information specifies parameters for the spatial-reuse technique. In some embodiments, the parameters specify a range of transmit powers and channel-availability sensing thresholds. In some embodiments, the parameters specify an operating point having at least one of: a fixed transmit power, or a fixed channel-availability sensing threshold. In some embodiments, the parameters are associated with transmit power control (TPC) threshold and a clear-channel assessment (CCA) threshold.

In some embodiments, a non-transitory computer-readable storage medium stores instructions that, when executed by an interface circuit included in an access point, cause the access point to transmit management information, by carrying out operations that include: transmitting, transmitting, to an electronic device, management information that enables the electronic device to use a spatial-reuse technique, where the electronic device, through the spatial-reuse technique, is allowed to adjust a transmit power and a channel-availability sensing threshold.

In some embodiments, the management information is transmitted in a unicast frame or in a broadcast frame. In some embodiments, the management information is intended solely for the electronic device. In some embodiments, the management information is intended for multiple electronic devices, including the electronic device, in a wireless local area network (WLAN). In some embodiments, the management information specifies parameters for the spatial-reuse technique. In some embodiments, the parameters specify a range of transmit powers and channel-availability sensing thresholds. In some embodiments, the parameters specify an operating point having at least one of: a fixed transmit power, or a fixed channel-availability sensing threshold. In some embodiments, the parameters are associated with transmit power control (TPC) threshold and a clear-channel assessment (CCA) threshold. In some embodiments, the interface circuit of the access point is further configured to: (i) receive, from the electronic device or from a second electronic device, feedback information that indicates communication performance for communication between the access point and the electronic device or the second electronic device; (ii) modify the parameters based on the feedback information; and (iii) transmit, to the electronic device, the modified parameters. In some embodiments, the access point further includes the antenna communicatively coupled to the one or more nodes.

In some embodiments, a method for transmitting management information includes using an interface circuit in an electronic device to: (i) transmit, to a second electronic device, management information that enables the second electronic device to use a spatial-reuse technique, where the second electronic device, through the spatial-reuse technique, is allowed to adjust a transmit power and a channel-availability sensing threshold; (ii) receive, from the second electronic device or from a third electronic device, feedback information that indicates communication performance for communication between the electronic device and the second electronic device or the third electronic device; (iii) modify the parameters based on the feedback information; and (iv) transmit, to the second electronic device, the modified parameters.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
one or more nodes configured to communicatively couple to an antenna; and
an interface circuit, communicatively coupled to the one or more nodes, configured to communicate with a second electronic device, and configured to:
receive, from the second electronic device, management information that enables the electronic device to use a spatial-reuse technique, wherein the electronic device, through the spatial-reuse technique, adjusts a transmit power and a channel-availability sensing threshold; and
transmit, using the spatial-reuse technique, one or more frames to the second electronic device or to a third electronic device,
wherein:
the management information comprises a minimum transmit power, a maximum transmit power, a minimum channel-availability sensing threshold, and a maximum channel-availability sensing threshold, and
decreasing the transmit power of the electronic device below a reference transmit power results in increasing the channel-availability sensing threshold of the electronic device above the minimum channel-availability sensing threshold.

2. The electronic device of claim 1, wherein the second electronic device comprises an access point.

3. The electronic device of claim 1, wherein the management information is received in one of: a unicast frame or a broadcast frame.

4. The electronic device of claim 1, wherein the management information is intended solely for the electronic device.

5. The electronic device of claim 1, wherein the management information is intended for multiple electronic devices, including the electronic device, in a wireless local area network (WLAN).

6. The electronic device of claim 1, wherein the management information specifies parameters for the spatial-reuse technique.

7. The electronic device of claim 6, wherein the interface circuit is further configured to operate in a range of transmit powers and channel-availability sensing thresholds specified by the parameters.

8. The electronic device of claim 6, wherein the parameters specify an operating point having at least one of: a fixed transmit power, or a fixed channel-availability sensing threshold.

9. The electronic device of claim 6, wherein the parameters are associated with a transmit power control (TPC) threshold and a clear-channel assessment (CCA) threshold.

10. The electronic device of claim 1, wherein the interface circuit is further configured to:
transmit, to the second electronic device, feedback information that indicates communication performance during communication between the electronic device and the second electronic device; and
receive, from the second electronic device, updated management information to control spatial-reuse by the electronic device.

11. The electronic device of claim 1, wherein the electronic device further comprises the antenna communicatively coupled to the one or more nodes.

12. An access point, comprising:
one or more nodes configured to communicatively couple to an antenna; and
an interface circuit, communicatively coupled to the one or more nodes, configured to communicate with an electronic device, and configured to:
transmit, to the electronic device, management information that enables the electronic device to use a spatial-reuse technique, wherein the electronic device, through the spatial-reuse technique, is allowed to adjust a transmit power and a channel-availability sensing threshold,
wherein:
the management information comprises a minimum transmit power, a maximum transmit power, a minimum channel-availability sensing threshold, and a maximum channel-availability sensing threshold, and
decreasing the transmit power of the electronic device below a reference transmit power results in increasing the channel-availability sensing threshold of the electronic device above the minimum channel-availability sensing threshold.

13. The access point of claim 12, wherein the management information is communicated via a unicast frame and is intended solely for the electronic device.

14. The access point of claim 12, wherein the management information is communicated via a broadcast frame and is intended for multiple electronic devices, including the electronic device, in a wireless local area network (WLAN).

15. The access point of claim 12, wherein the management information specifies parameters for the spatial-reuse technique.

16. The access point of claim 15, wherein the parameters specify a range of transmit powers and channel-availability sensing thresholds.

17. The access point of claim 15, wherein the parameters specify an operating point having at least one of: a fixed transmit power, or a fixed channel-availability sensing threshold.

18. The access point of claim 15, wherein the parameters are associated with transmit power control (TPC) threshold and a clear-channel assessment (CCA) threshold.

19. The access point of claim 15, wherein the interface circuit is further configured to:
receive, from the electronic device or from a second electronic device, feedback information that indicates communication performance during communication between the access point and the electronic device or the second electronic device;
modify the parameters based on the feedback information; and
transmit, to the electronic device, the modified parameters.

20. A method for transmitting management information, the method comprising:
using an interface circuit of an access point to:

transmit, to an electronic device, management information that enables the electronic device to use a spatial-reuse technique, wherein the electronic device, through the spatial-reuse technique, is allowed to adjust a transmit power and a channel-availability sensing threshold;

receive, from the electronic device or from a second electronic device, feedback information that indicates communication performance during communication between the access point and the electronic device or the second electronic device;

modify parameters for spatial-reuse based on the feedback information; and transmit, to the electronic device, the modified parameters, wherein:
  the management information comprises the parameters including a minimum transmit power, a maximum transmit power, a minimum channel-availability sensing threshold, and a maximum channel-availability sensing threshold, and decreasing the transmit power of the electronic device below a reference transmit power results in increasing the channel-availability sensing threshold of the electronic device above the minimum channel-availability sensing threshold.

* * * * *